US008587710B2

United States Patent
Jeon

(10) Patent No.: US 8,587,710 B2
(45) Date of Patent: Nov. 19, 2013

(54) APPARATUS AND METHOD FOR CONTROLLING PICTURE USING IMAGE RECOGNITION

(75) Inventor: Hyeong-baek Jeon, Gwangju-si (KR)

(73) Assignee: Pantech Co., Ltd., Seoul (KR)

( * ) Notice: Subject to any disclaimer, the term of this patent is extended or adjusted under 35 U.S.C. 154(b) by 344 days.

(21) Appl. No.: 12/853,798

(22) Filed: Aug. 10, 2010

(65) Prior Publication Data

US 2011/0069215 A1 Mar. 24, 2011

(30) Foreign Application Priority Data

Sep. 24, 2009 (KR) ........................ 10-2009-0090650

(51) Int. Cl.

| | |
|---|---|
| *H04N 5/222* | (2006.01) |
| *H04N 5/262* | (2006.01) |
| *H04N 7/18* | (2006.01) |
| *G06F 3/033* | (2013.01) |

(52) U.S. Cl.

USPC ..................... 348/333.01; 348/240.2; 348/62; 715/863

(58) Field of Classification Search

USPC ................ 348/333.02, 333.01, 62, 77, 240.2; 715/863, 864, 865, 866, 800

See application file for complete search history.

(56) References Cited

U.S. PATENT DOCUMENTS 7,158,172 B2 * 1/2007 Kawaoka et al. .......... 348/211.1
7,502,036 B2 * 3/2009 Kramer et al. ................ 345/629
7,787,024 B2 * 8/2010 Yoshida ..................... 348/231.1
7,990,421 B2 * 8/2011 Thorn ...................... 348/211.99
8,237,655 B2 * 8/2012 Yabe et al. .................... 345/157
8,379,134 B2 * 2/2013 Foster ........................... 348/345
2001/0042245 A1 11/2001 Iwamura
2002/0030699 A1 * 3/2002 Van Ee .......................... 345/810
2005/0174459 A1 * 8/2005 Naka ....................... 348/333.01
2007/0283296 A1 * 12/2007 Nilsson ........................ 715/863
2008/0024620 A1 1/2008 Yoshida et al.
2008/0025576 A1 1/2008 Li et al.
2008/0212831 A1 * 9/2008 Hope ........................... 382/103
2008/0244465 A1 * 10/2008 Kongqiao et al. ............. 715/863
2009/0228841 A1 * 9/2009 Hildreth ........................ 715/863
2010/0125816 A1 * 5/2010 Bezos ........................... 715/863
2010/0138797 A1 * 6/2010 Thorn ........................... 715/863
2010/0275166 A1 * 10/2010 Jeon et al. ..................... 715/863
2011/0111798 A1 * 5/2011 Jeon et al. .................. 455/556.1
2013/0088559 A1 * 4/2013 Han et al. .................. 348/14.01

FOREIGN PATENT DOCUMENTS

| | | |
|---|---|---|
| CN | 1905629 | 1/2007 |
| CN | 1993672 | 7/2007 |
| EP | 1748378 | 1/2007 |
| KR | 10-2003-0039664 | 5/2003 |

(Continued)

OTHER PUBLICATIONS

Search Report of EP Patent Application No. 10 17 2480 issued on Sep. 15, 2010, corresponding to U.S Appl. No. 12/853,798.

(Continued)

*Primary Examiner* — John Villecco
(74) *Attorney, Agent, or Firm* — H.C. Park & Associates, PLC

(57) ABSTRACT

A picture control apparatus provides control of a picture displayed on a display of a mobile terminal according to an action detected through image recognition. A picture control method includes detecting an action from images captured by a camera, and controlling a picture displayed on a display if the detected action is a specific action.

23 Claims, 2 Drawing Sheets

200
CAMERA
100
160
ACTION DETECTOR
ACTION SETTING INFORMATION
ACTION SETTING UNIT
DRIVER
110
140
CONTROL COMMAND
PICTURE CONTROLLER
SOUND CONTROLLER
130
120
150
DISPLAY
SOUND OUTPUT UNIT
300
400

(56) References Cited

FOREIGN PATENT DOCUMENTS

| | | |
|---|---|---|
| KR | 10-2004-0018586 | 3/2004 |
| KR | 1020040023088 | 3/2004 |
| KR | 10-2004-0049465 | 6/2004 |
| KR | 10-2004-0053997 | 6/2004 |
| KR | 10-2006-0133428 | 12/2006 |
| KR | 10-2007-0023863 | 3/2007 |
| KR | 10-2007-0036111 | 4/2007 |
| KR | 10-2007-0042136 | 4/2007 |
| KR | 10-2007-0045664 | 5/2007 |
| KR | 1020080041051 | 5/2008 |
| KR | 1020090060547 | 6/2009 |
| KR | 1020090064680 | 6/2009 |

OTHER PUBLICATIONS

Translation of First Notification of Office Action dated Apr. 11, 2012 from the State Intellectual Property Office of China for Corresponding Application No. 201010284923.6.

* cited by examiner

APPARATUS AND METHOD FOR CONTROLLING PICTURE USING IMAGE RECOGNITION

CROSS-REFERENCE TO RELATED APPLICATION

This application claims priority to and the benefit under 35 U.S.C. §119(a) of Korean Patent Application No. 10-2009-0090650, filed on Sep. 24, 2009, the disclosure of which is incorporated by reference in its entirety for all purposes.

BACKGROUND

1. Field

The following description relates to display control, and more particularly, to an apparatus to control a picture displayed on a display of a mobile terminal, and a method for controlling a picture displayed on a display of a mobile terminal.

2. Discussion of the Background

A display control technique has been developed which enlarges or reduces a size of a picture displayed on a display, such as a liquid crystal display (LCD) of a mobile terminal, through a user's physical manipulations, such as manipulation of key buttons or a touch screen.

However, a technique for controlling pictures displayed on a display, without any direct physical manipulations by the user is needed.

SUMMARY

Exemplary embodiments of the present invention provide a picture control apparatus using image recognition, which can control a picture that is displayed on a display of a mobile terminal, etc., according to a user's action detected through image recognition. Exemplary embodiments of the present invention also provide a picture control method using image recognition, which can control a picture that is displayed on a display of a mobile terminal, etc., according to a user's action detected through image recognition.

Additional features of the invention will be set forth in the description which follows, and in part will be apparent from the description, or may be learned by practice of the invention.

An exemplary embodiment of the present invention provides a picture control apparatus including: an action detector to detect a specific action from images captured by a camera; and a picture controller to control a picture displayed on a display if the specific action is detected by the action detector.

An exemplary embodiment of the present invention provides a picture control method including: detecting an action from images captured by a camera; and controlling a picture displayed on a display if the detected action is a specific action.

It is to be understood that both the foregoing general description and the following detailed description are exemplary and explanatory and are intended to provide further explanation of the invention as claimed. Other objects, features and advantages will be apparent from the following description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

Figure 1:
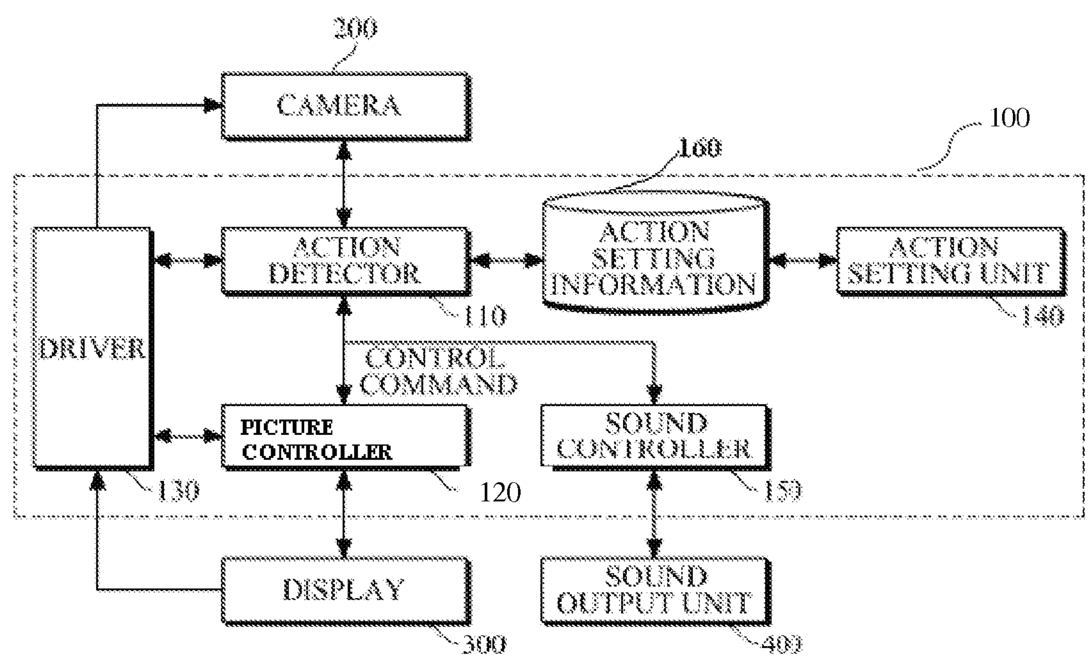
FIG. 1 is a block diagram illustrating a picture control apparatus using image recognition, according to an exemplary embodiment.

Throughout the drawings and the detailed description, unless otherwise described, the same drawing reference numerals are understood to refer to the same elements, features, and structures. The relative size and depiction of these elements may be exaggerated for clarity, illustration, and convenience.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

FIG. 1 is a block diagram illustrating picture control apparatus 100 using image recognition, according to an exemplary embodiment. The picture control apparatus 100 may be implemented in the form of hardware, software, or a combination thereof, and may be disposed in a mobile terminal having a camera. The picture may be still images, moving images, and/or video.

As illustrated in FIG. 1, the picture control apparatus 100 includes an action detector 110 and a picture controller 120. The picture control apparatus 100 further includes a driver 130, an action setting unit 140, and a sound controller 150.

The action detector 110 receives images of a user captured by a camera 200 and detects a specific action from the images of the user. The specific action may be detected by analyzing variations of feature points included in the images of the user to thus recognize variations in motion or expression. Although described as being of the user, the images are not limited thereto such that the action detector 110 may recognize variations in motion or expression of an object, an animal, an, or a subject of the image, and the like, i.e., not the user.

For example, the action detector 110 may recognize the user's motion or expression variations from the images of the user by detecting the user's movement toward or away from the camera 200, the user's movement to the right or left, a wink of the user's right or left eye, the user's lip shape, an inclination of the user's face, a rotation of the user's face to the left or right, a grimace of the user's face, thereby detecting a specific action.

If the action detector 110 detects a specific action, the picture controller 120 controls a picture displayed on a display 300. The picture controller 120 may control a picture displayed on the display 300 by enlarging or reducing a size of the picture or by varying coordinates, colors, and brightness of individual pixels belonging to the picture to change color effects, white balances, etc.

In the case of enlarging or reducing the size of the picture, the picture controller 120 may enlarge or reduce a size of a picture stored in a memory or transmitted in real-time through a network. The picture transmitted through the network may be a picture transmitted from a same channel or from a different channel and/or may be transmitted in real time or as delayed.

For example, the picture controller 120 may enlarge or reduce a size of an entire or partial area of a single-layered picture, such as a JPG file or the like.

As another example, the picture controller 120 may enlarge or reduce a size of a layer in a multi-layered picture, such as a PHOTOSHOP® file or the like.

As another example, the picture controller 120 may enlarge or reduce a size of an object in a tree-structured picture including a plurality of associated objects, such as an HTML file or the like.

Accordingly, the picture control apparatus 100 controls a picture displayed on a display of a mobile terminal in such a manner as to enlarge or reduce the size of the picture according to a user's action detected through image recognition from the images of the user captured by a camera 200 without any direct physical manipulation of the mobile terminal from the user.

The driver 130 may drive a picture control function in response to a user's touch on the display 300. That is, when the display 300 is a touch screen, if a user touches a specific location on the touch screen 300 while a picture is reproduced, the driver 130 drives the camera 200 to photograph the user.

Then, the action detector 110 detects the user's action from the images of the user captured by the camera 200, and the picture controller 120 controls a picture displayed on the touch screen 300 according to the user's detected action.

At this time, the picture controller 120 may enlarge or reduce the size of the picture and center the picture at the specific location where the user's touch has occurred on the touch screen 300. That is, if the user touches a specific location on the touch screen 300, the driver 130 drives a picture control function, and if the action detector 110 detects a specific action from the images of the user captured by the camera 200, the picture controller 120 enlarges or reduces a picture centering on the specific location where the user's touch has occurred.

Accordingly, a picture may be controlled according to a user's action that is detected through image recognition in such a manner as to be enlarged or reduced without any physical manipulations from the user.

The action setting unit 140 may set specific actions that can be detected by the action detector 110. That is, the action setting unit 140 allows a user to set specific actions that will be used to control pictures and then stores them as action setting information 160, which may be, without limitation, a storage, such as read-only memory, random access memory, flash memory, removable memory, or a register included in a processor. The stored action setting information 160 is referred to by the action detector 110 in order to detect a specific action.

The sound controller 150 controls sound associated with a picture that is controlled by the picture controller 120. That is, the sound controller 150 is used to control sound associated with a picture that is controlled by the picture controller 120 according to a user's action detected through image recognition. The sound control may be carried out simultaneously with or separately from the picture control.

For example, the sound control may increase or decrease a volume of sound that is output through a sound output unit 400 in association with the picture. Accordingly, sound associated with a picture may also be controlled according to a user's action detected through image recognition. For example, the user may increase or decrease the volume of sound in association with a picture without any physical manipulations from the user.

Figure 2:
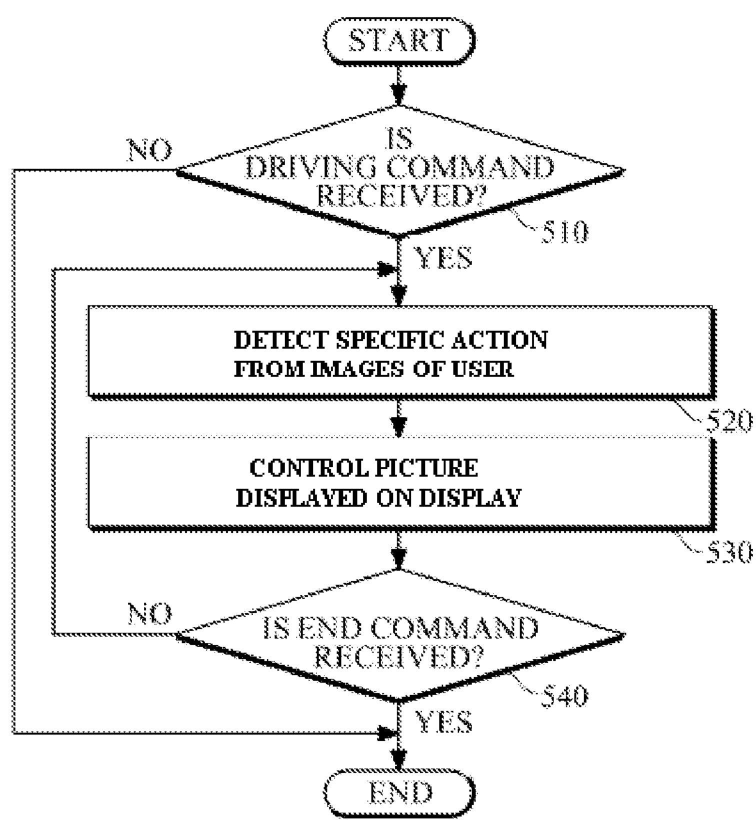
FIG. 2 is a flowchart illustrating a picture control method, according to an exemplary embodiment.

Hereinafter, a method in which the picture control apparatus 100 of FIG. 1 using image recognition, having the above-described structure, controls a picture will be described in detail with reference to FIG. 2, below. FIG. 2 is a flowchart illustrating a picture control method, according to an exemplary embodiment.

First, it is determined whether a driving command is received, which may be generated due to touch, etc. on a specific region of a touch screen of a mobile terminal and images of a user are captured in operation 510. If the driving command is received and the camera is driven to capture the images of the user, the picture control apparatus detects a specific action from the captured images of the user in operation 520.

For example, the specific action may be detected by detecting the user's movement toward or away from a camera from the images of the user. Here, the user's movement toward or away from the camera may be detected by recognizing variations in object sizes of the images of the user captured by the camera.

As another example, the specific action may be detected by detecting the user's movement to the left or right from the images of the user. The user's movement to the left or right may be detected by recognizing location movements, rotations, inclinations, etc. of feature points included in the images of the user.

As another example, the specific action may be detected by detecting a wink of the user's left or right eye from the images of the user. The wink of the user's left or right eye may be detected by recognizing variations of feature points corresponding to the user's left or right eye included in the images of the user.

As another example, the specific action may be detected by detecting the user's lip shape from the images of the user. The user's lip shape may be detected by recognizing variations of feature points corresponding to the user's lips included in the images of the user.

As another example, the specific action may be detected by detecting, from the images of the user, an inclination of the user's face. The inclination of the user's face may be detected by recognizing location movements, rotations, or inclinations of feature points included in the images of the user.

As another example, the specific action may be detected by detecting, from the images of the user, a rotation of the user's face to the left or right. The rotation of the user's face to the left or right may be detected by recognizing location movements, rotations, inclinations, etc. of feature points included in the images of the user.

As another example, the specific action may be detected by detecting a grimace of the user's face from the images of the user. The grimace of the user's face may be detected by recognizing variations of feature points corresponding to the user's eyes, nose, and lips, included in the images of the user.

If a specific action is detected in operation 520, the picture control apparatus controls a picture displayed on a display of a mobile terminal in operation 530. The control on the picture is maintained until an end command is received in operation 540.

In operation 530, the control on the picture may be to enlarge or reduce a size of a picture stored in a memory or transmitted in real-time through a network. For example, in operation 530, the picture control apparatus may enlarge or reduce a size of an entire or partial area of a single-layered picture, such as a JPG file or the like.

As another example, in operation 530, the picture control apparatus 100 may enlarge or reduce a size of a layer in a multi-layered picture, such as a PHOTOSHOP® file or the like.

As another example, in operation 530, the picture control apparatus 100 may enlarge or reduce a size of an object in a tree-structured picture including a plurality of associated objects, such as an HTML file or the like.

Accordingly, the picture control apparatus using image recognition may control a picture displayed on a display of a mobile terminal, etc., in such a manner as to enlarge or reduce the size of the picture, according to a user's action that is detected through image recognition from the images of the user captured by a camera without any physical manipulation from the user.

Hereinafter, examples in which the picture control apparatus using image recognition according to an exemplary embodiment is applied to a mobile terminal will be described.

For example, by implementing the picture control apparatus in such a manner as to enlarge a size of a picture displayed on a display if a user's movement toward a camera is detected from images captured by the camera, and to reduce a picture displayed on the display if is the user's movement away from the camera is detected from the captured images, pictures may be controlled according to the user's movement toward or away from the camera without any direct physical manipulations from the user.

As another example, by implementing the picture control apparatus in such a manner as to enlarge a size of a picture displayed on a display if a user's movement to the left is detected from images captured by the camera, and to reduce a size of a picture displayed on the display if the user's movement to the right is detected from the captured images, picture may be controlled according to the user's movement to the left or right without any direct physical manipulations from the user.

As another example, by implementing the picture control apparatus in such a manner as to enlarge a size of a picture displayed on a display if a wink of a user's left eye is detected from images captured by the camera, and to reduce a size of a picture displayed on the display if a wink of the user's right eye is detected from the captured images, pictures may be controlled according to a wink of the user's left or right eye, without any direct physical manipulations from the user.

As another example, by implementing the picture control apparatus in such a manner as to enlarge a size of a picture displayed on a display if that a user opens his or her lips is detected from images captured by the camera, and to reduce a size of a picture displayed on the display if that the user pouts his or her lips is detected from the captured images, pictures may be controlled according to the user's lip shape, without any direct physical manipulations from the user.

As another example, by implementing the picture control apparatus in such a manner as to enlarge a size of a picture displayed on a display if that a user's face is inclined forward is detected from images captured by the camera, and to reduce a size of a picture displayed on the display if that the user's face is inclined backward is detected from the captured images, pictures may be controlled according to an inclination of the user's face, without any direct physical manipulations from the user.

As another example, by implementing the picture control apparatus in such a manner as to enlarge a size of a picture displayed on a display if a rotation of a user's face to the left is detected from images captured by the camera, and to reduce a size of a picture displayed on the display if a rotation of the user's face to the right is detected from the captured images, pictures may be controlled according to a rotation of the user's face to the left or right, without any direct physical manipulations from the user.

As another example, by implementing the picture control apparatus in such a manner as to enlarge a size of a picture displayed on a display if a grimace of a user's face is detected from images captured by the camera, and to reduce a size of a picture displayed on the display if a smile on the user's face is detected from the captured images, pictures may be controlled according to the user's expression, without any direct physical manipulations from the user.

Further, the picture control apparatus may adjust a degree of enlargement or reduction of a picture in accordance with a speed at which a user approaches the camera or moves away from the camera, how many times the approach or moving-away occurs, a speed at which the user moves to the left or right, how many times the user's movement to the left or right occurs, a speed at which the user winks his or her left or right eye, how many times the wink of the user's left or right eye occurs, a degree of opening of the user's lips, a degree of inclination of the user's face, a speed at which the user's face rotates to the left or right, how many times the user's face rotates, or a degree of a grimace on the user's face.

For example, the degree of enlargement or reduction of a picture can be adjusted by enlarging a size of a picture to 150% when a user inclines their face once forward and to 200% when the user inclines their face twice forward.

The above-described embodiments are applicable to display control technologies or applications thereof.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A picture control apparatus, comprising:

a display to display a picture and to receive a touch corresponding to a location on the display;

a driver to drive a camera to capture images for action detection;

an action detector to detect a specific action from the images captured by the camera; and a picture controller configured to control the picture displayed on the display in association with the location on the display if the specific action is detected by the action detector.

2. The picture control apparatus of claim 1, wherein the picture controller enlarges or reduces a size of the picture.

3. The picture control apparatus of claim 1, wherein the picture controller enlarges or reduces a size of an entire or partial area of the picture, the picture corresponding to a single-layered picture.

4. The picture control apparatus of claim 2, wherein the picture controller enlarges or reduces a size of a layer of the picture, the picture corresponding to a multi-layered picture.

5. The picture control apparatus of claim 2, wherein the picture controller enlarges or reduces a size of an object in the picture, the picture corresponding to a tree-structured picture comprising a plurality of objects.

6. The picture control apparatus of claim 2, wherein the picture controller enlarges or reduces a size of the picture stored in a memory.

7. The picture control apparatus of claim 2, wherein the picture controller enlarges or reduces a size of the picture transmitted through a network.

8. The picture control apparatus of claim 1, wherein the driver is configured to drive a picture control function in response to the touch on a touch screen of the display.

9. The picture control apparatus of claim 8, wherein the picture controller enlarges or reduces a size of the picture and centers the picture at the location where the touch has occurred on the touch screen.

10. The picture control apparatus of claim 1, further comprising an action setting unit to set the specific action that is detected by the action detector.

11. The picture control apparatus of claim 1, further comprising a sound controller to control sound associated with the picture according to the specific action detected by the action detector.

12. The picture control apparatus of claim 1, wherein the action detector detects a movement toward or away from the camera from the images.

13. The picture control apparatus of claim 1, wherein the action detector detects a movement to the left or to the right from the images.

14. The picture control apparatus of claim 1, wherein the action detector detects a wink of a left eye or a right eye from the images.

15. The picture control apparatus of claim 1, wherein the action detector detects a lip shape from the images.

16. The picture control apparatus of claim 1, wherein the action detector detects an inclination of a face towards or away from the camera from the images.

17. The picture control apparatus of claim 1, wherein the action detector detects a rotation of a face to the left or right from the images.

18. The picture control apparatus of claim 1, wherein the action detector detects a grimace of a face from the images.

19. A picture control method comprising:

displaying a picture on a display and receiving a touch corresponding to a location on the display;

driving a camera to capture images for action detection;

detecting an action from the images captured by the camera; and controlling the picture displayed on the display in association with the location on the display if the detected action is a specific action.

20. The picture control method of claim 19, further comprising:

receiving a driving command to detect the action.

21. The picture control method of claim 19, further comprising:

terminating the detecting and the controlling if an end command is received.

22. The picture control method of claim 19, wherein the specific action is a variation in motion or a variation in a facial expression.

23. The picture control method of claim 19, further comprising:

adjusting a degree of enlargement or reduction of the picture in accordance with a speed or a number of the specific action.

* * * * *